R. SCHÜTTAUF.
FILM PACK.
APPLICATION FILED MAR. 31, 1910.
1,015,514.
Patented Jan. 23, 1912.
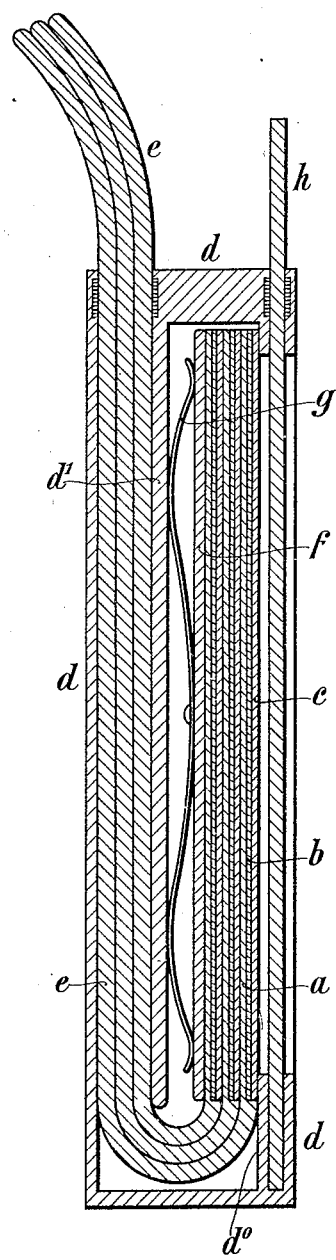
Witnesses:
Paul Krüger
Richard Helm
Inventor:
Richard Schüttauf

UNITED STATES PATENT OFFICE.

RICHARD SCHÜTTAUF, OF JENA, GERMANY, ASSIGNOR TO THE FIRM OF CARL ZEISS, OF JENA, GERMANY.

FILM-PACK.

1,015,514.

Specification of Letters Patent.

Patented Jan. 23, 1912.

Application filed March 31, 1910. Serial No. 552,691.

*To all whom it may concern:*

Be it known that I, RICHARD SCHÜTTAUF, a citizen of the German Empire, residing at Carl-Zeiss strasse, Jena, in the Grand Duchy of Saxe-Weimar, Germany, have invented a new and useful Film-Pack, of which the following is a specification.

The invention consists in an improvement in film packs. It is a well known disadvantage of these packs, that in the operation of changing, i. e., in removing after exposure that one of the film sheets (fixed on carriers impermeable to light) which for the time being is the front sheet, or in the shifting of a shutter or covering sheet designed to obviate an untimely exposure, often the sensitive layer, at least at its surface, is damaged.

According to the present invention, the film sheet is to be arranged on its carrier in such a way that its sensitive layer faces the carrier. Then, of course, the position of the negative image on the film sheet differs from the usual position, so that in the printing work the transparent backing, which together with the sensitive layer forms the film sheet, separates as an intermediate layer the negative image from the positive image to be produced. But that does not afford any perceptible disadvantage, as long as the backing is not essentially thicker than those hitherto used.

For time exposures a second advantage may be derived from the reversed position of the film sheets by coloring the transparent backing of the sensitive layer deep-yellow, so as to save employing a yellow screen disk in front of the objective. Such disks, as is well known, must be made with great care, as otherwise a deterioration of the image takes place, their cost being correspondingly high.

In the annexed drawing a section through a film pack constructed according to the invention is represented.

To each carrier $a$ a film sheet $b\ c$ is fixed in such a position that the sensitive layer $b$ immediately faces the carrier. The backing $c$ of the film sheet serves as a covering, which prevents the layer $b$ from being damaged, when the film sheet, having become the foremost by the operation of changing, after exposure is being pulled along the inner surface $d°$ of the casing $d$ in the next operation of changing. In the example shown, the operating extension $e$ of each carrier has the same thickness as both the carrier proper $a$ and the sheet $b\ c$ together. With regard thereto the front wall $d^1$ of the rear chamber is an immovable part of the casing $d$, a special loose plate $f$ and a pressure spring $g$ being provided for automatically shifting, during each operation of changing, the contents of the front chamber toward the exposure opening shown as being closed by a shutter $h$.

I claim:

A film pack member consisting of a carrier and a film sheet fixed to this carrier, the film sheet consisting of a transparent backing and a sensitive layer and being so arranged on the carrier, that the said layer immediately faces the carrier.

RICHARD SCHÜTTAUF.

Witnesses:
 PAUL KRÜGER,
 ALFRED MACKEDANZ.